Jan. 8, 1946.   C. CHRESTOFF   2,392,310
FLOATING GRIPPING JAW FOR VISES AND CHUCKS
Filed Oct. 15, 1942
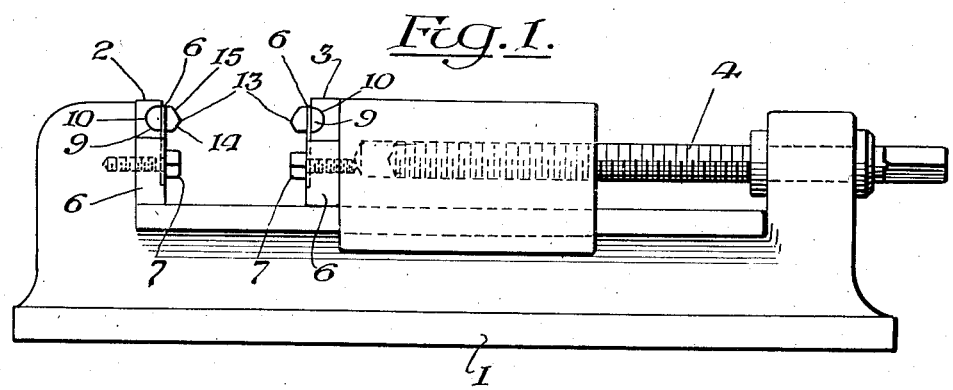
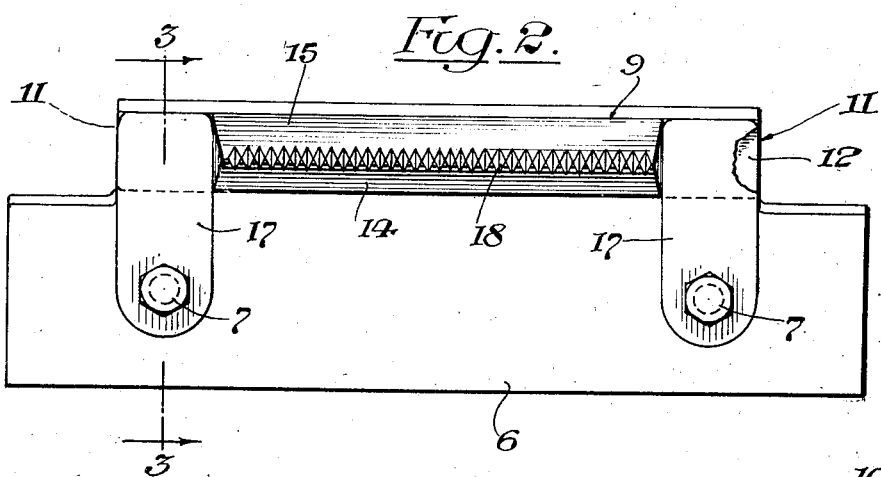
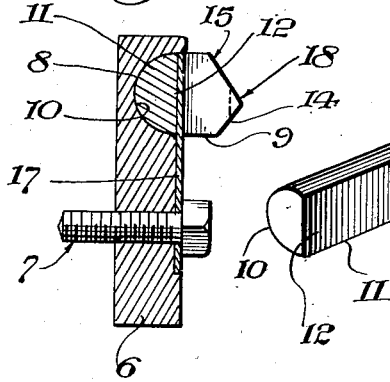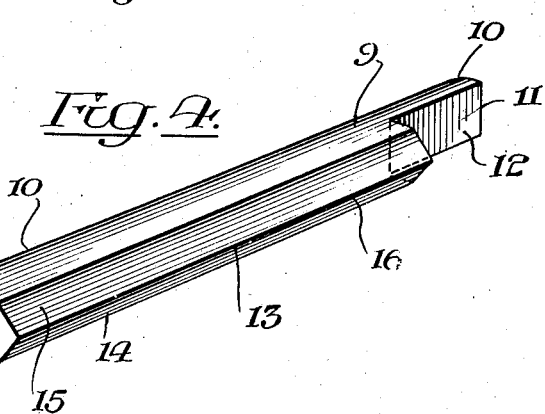
Inventor-
Christopher Chrestoff
by his Attorney Patented Jan. 8, 1946

2,392,310

UNITED STATES PATENT OFFICE 2,392,310

FLOATING GRIPPING JAW FOR VISES AND CHUCKS

Christopher Chrestoff, Cleveland, Ohio, assignor to The National Acme Company, Cleveland, Ohio, a corporation of Ohio Application October 15, 1942, Serial No. 462,140

3 Claims. (Cl. 81—38)

This invention relates to gripping jaws for vises or chucks, or other holding means for gripping irregular surfaces to be worked upon by milling, turning or grinding tools, the object of the invention being to provide improved floating gripping jaws, simple in construction, easily applied and effective in use.

In the drawing accompanying and forming a part of this specification, Fig. 1 illustrates a form of vise to which this improvement has been applied.

Fig. 2 is a face view of one jaw.

Fig. 3 is a section on line 3—3 of Fig. 2, and

Fig. 4 is a perspective view of the floating gripping member.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing since the invention is capable of other embodiments, and that the phraseology which I employ is for the purpose of description and not of limitation.

The present improvement is shown applied to a form of vise comprising a suitable base 1 having a fixed jaw 2 and a sliding jaw 3 operated by a worm screw 4.

To each of these jaws is applied a removable face plate 6 which may be readily bolted thereto by bolts 7 and which can be readily substituted for the ordinary face plates frequently carried by such jaws.

Each face plate is provided with a curved—shown as semi-circular—recess or seat 8 in which is located a floating gripping member 9. The member 9 is provided with a cooperating rear curved portion 10—shown as convex—and has projecting ends or journals 11 provided with flat front faces 12 between which flat faces is located the gripping portion 13 of the gripping member.

This gripping portion 13 comprises an angular face—shown as triangular in section—one part, as the under portion 14, being narrower than the upper portion 15 so that the gripping edge 16 is located below the center of the gripping member 9. Thus, this angular face forms an effective and efficient gripping edge for gripping the work and holding it against upward movement.

For securing the floating gripping member in position on the face plate, a pair of flat or plate springs 17 are secured to the face plate, preferably by the same bolts that secure the plate to the jaw, and of sufficient resiliency to hold the floating gripping member firmly in place while permitting angular adjustment thereof to any desired gripping position.

The spring plates 17 project over the flat surfaces 11 of the floating gripping member and so hold it in any desired angular position since it is obvious that it can be somewhat rotated in the curved seat of its face plate and, in practice, the gripping member may also have an endwise adjustment as by making the springs somewhat narrower or spacing them farther apart or by making the gripping portion 16 of less length or in any other suitable way. Not only this, but the gripping member can be readily removed and other floating gripping members substituted therefor as, for instance, those having serrated edges shown at 18 (see Fig. 2) or having any other irregular face that may be desired.

From the foregoing, it will be seen that, to apply these floating gripping members to an ordinary chuck or vise, it is merely necessary to remove the ordinary face plates thereof and substitute these improved face plates by bolting them in position by means of the bolts 7 and that the floating gripping members 9 may be readily removed, being held in place simply by a pair of plate springs carried by the face plates and others of different form substituted therefor so that the improvement consists of an auxiliary face plate or jaw readily attachable to a vise or chuck and a floating adjustable gripping member and a pair of plate springs for holding it in place.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A gripping member for vises and chucks comprising a face plate, means for rigidly securing the plate to a vise or chuck, a detachable and interchangeable floating gripping member, said plate and member having one a curved seat and the other a cooperating curved portion corresponding with said seat, said gripping member having a pair of laterally projecting flat-faced ends at its front side having therebetween a forwardly projecting gripping face, and a pair of flat plate springs rigidly secured to said face plate and overlapping the front flat-faced ends of the gripping member, said gripping member having an angular gripping face with one side wider than the other.

2. A gripping member for vises and chucks comprising a face plate, a detachable and interchangeable floating gripping member, said plate and member having one a curved seat and the other a cooperating curved portion corresponding with said seat, said gripping member having a pair of laterally projecting flat-faced ends having therebetween a forwardly projecting gripping face, and a pair of flat plate springs secured to said face plate and overlapping the flat-faced ends of the gripping member, said springs secured below the gripping member by means adapted to secure the face plate to the jaws of a vise or chuck.

3. A gripping member for vises and chucks comprising a face plate, means for rigidly securing the plate to a vise or chuck, a detachable and interchangeable floating gripping member, said plate and member having one a curved seat and the other a cooperating curved portion corresponding with said seat, said gripping member having a pair of laterally projecting flat-faced ends having therebetween a forwardly projecting gripping face, and a pair of flat plate springs rigidly secured to said face plate and overlapping the flat-faced ends of the gripping member, said gripping face having serrations along its gripping edge.

CHRISTOPHER CHRESTOFF.